United States Patent
Tsai

(10) Patent No.: US 12,132,882 B2
(45) Date of Patent: *Oct. 29, 2024

(54) DETECTION DEVICE AND DETECTION METHOD USING AVALANCHE DIODE ARRAY AND CALIBRATION MATRIX GENERATING METHOD THEREOF

(71) Applicant: PixArt Imaging Inc., Hsin-Chu County (TW)

(72) Inventor: Tso-Sheng Tsai, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 267 days.

This patent is subject to a terminal disclaimer.

(21) Appl. No.: 17/826,533

(22) Filed: May 27, 2022

(65) Prior Publication Data

US 2022/0286664 A1 Sep. 8, 2022

Related U.S. Application Data

(63) Continuation of application No. 16/458,605, filed on Jul. 1, 2019, now Pat. No. 11,381,806, which is a continuation-in-part of application No. 16/129,804, filed on Sep. 13, 2018, now Pat. No. 11,353,563.

(51) Int. Cl.
| | |
|---|---|
| *H04N 17/00* | (2006.01) |
| *G01J 1/44* | (2006.01) |
| *G06T 7/80* | (2017.01) |
| *H04N 25/76* | (2023.01) |

(52) U.S. Cl.
CPC .............. *H04N 17/002* (2013.01); *G01J 1/44* (2013.01); *G06T 7/80* (2017.01); *H04N 25/76* (2023.01); *G01J 2001/444* (2013.01); *G01J 2001/4466* (2013.01)

(58) Field of Classification Search
None
See application file for complete search history.

(56) References Cited

U.S. PATENT DOCUMENTS

| | | | |
|---|---|---|---|
| 9,642,215 B2 | 5/2017 | Verma | |
| 2011/0006188 A1 | 1/2011 | Lin | |
| 2016/0064579 A1* | 3/2016 | Hirigoyen | H01L 31/02327 438/69 |
| 2019/0191120 A1* | 6/2019 | Ikedo | G01T 1/248 |

* cited by examiner

*Primary Examiner* — Luke D Ratcliffe
(74) *Attorney, Agent, or Firm* — WPAT, P.C

(57) ABSTRACT

There is provided a detection device using a SPAD array including a sensor array, multiple counters, a processor and a frame buffer. The sensor array includes a plurality of SPADs respectively generates an avalanche current while receiving a photon. Each counter counts a number of triggering times of the avalanche current of a corresponding SPAD within an exposure interval. The frame buffer is pre-stored with a plurality of gain calibration values corresponding to every SPAD of the sensor array. The processor accesses the gain calibration values to accordingly calibrate a counting image frame outputted by the sensor array to output a calibrated image frame.

20 Claims, 13 Drawing Sheets

|    |    |    |    |    |    |    |    |    |    |
|----|----|----|----|----|----|----|----|----|----|
| 12 | 10 | 12 | 12 | 10 | 10 | 12 | 12 | 12 | 12 |
| 10 | 10 | 10 | 12 | 12 | 12 | 12 | 12 | 12 | 12 |
| 12 | 10 | 10 | 10 | 10 | 11 | 12 | 11 | 12 | 12 |
| 12 | 12 | 10 | 10 | 12 | 12 | 11 | 12 | 12 | 10 |
| 11 | 12 | 12 | 11 | 11 | 11 | 12 | 11 | 12 | 12 |
| 10 | 10 | 12 | 10 | 10 | 10 | 11 | 12 | 11 | 10 |
| 12 | 12 | 11 | 12 | 12 | 11 | 12 | 10 | 10 | 12 |
| 10 | 12 | 12 | 10 | 12 | 10 | 11 | 12 | 11 | 11 |
| 10 | 12 | 10 | 12 | 11 | 12 | 12 | 12 | 12 | 11 |
| 11 | 12 | 10 | 11 | 11 | 12 | 12 | 12 | 12 | 12 |

FIG. 15A

|    |    |    |    |    |    |    |    |    |    |
|----|----|----|----|----|----|----|----|----|----|
| 12 | 12 | 12 | 12 | 12 | 13 | 13 | 12 | 12 | 13 | 12 |
| 13 | 13 | 13 | 13 | 13 | 13 | 13 | 13 | 13 | 13 | 13 |
| 12 | 13 | 13 | 12 | 13 | 13 | 12 | 12 | 12 | 12 | 12 |
| 12 | 12 | 13 | 12 | 12 | 13 | 12 | 12 | 13 | 13 | 13 |
| 12 | 12 | 13 | 13 | 12 | 13 | 13 | 13 | 13 | 12 | 12 |
| 13 | 12 | 13 | 12 | 13 | 13 | 13 | 12 | 12 | 12 | 13 |
| 12 | 13 | 13 | 12 | 13 | 12 | 12 | 13 | 13 | 13 | 12 |
| 12 | 12 | 12 | 13 | 13 | 12 | 12 | 13 | 12 | 12 | 13 |
| 12 | 13 | 13 | 12 | 13 | 13 | 12 | 13 | 13 | 12 | 12 |
| 12 | 12 | 13 | 12 | 13 | 13 | 13 | 12 | 12 | 12 | 13 |

FIG. 15B

DETECTION DEVICE AND DETECTION METHOD USING AVALANCHE DIODE ARRAY AND CALIBRATION MATRIX GENERATING METHOD THEREOF

RELATED APPLICATIONS

The present application is a continuation application of U.S. patent application Ser. No. 16/458,605 filed on Jul. 1, 2019, which is a continuation-in-part application of U.S. patent application Ser. No. 16/129,804 filed on Sep. 13, 2018, the disclosures of which are hereby incorporated by reference herein in their entirety.

BACKGROUND

1. Field of the Disclosure

This disclosure generally relates to an optical detection device and, more particularly, to a detection device and a detection method that homogenize a current image frame outputted by a SPAD array using a pre-stored gain calibration matrix and a calibration matrix generating method thereof.

2. Description of the Related Art

Nowadays, the optical distance detection device generally adopts the imaging technique based on a CCD image sensor or a CMOS image sensor. The method of calculating an object distance according to a shifted time from a light beam emitted from a light source, reflected by an object and finally received by an image sensor is referred to the time-of-flight technique.

In processing light signals in a weak light environment and having a high frequency, the single photon detection is another choice.

For example, a single photon avalanche diode (SPAD) is used as an indicator of reflected light. When a photon is received by the SPAD, an avalanche current is triggered in response that one photon is detected. The pulse caused by the avalanche current is considered a photon event.

When an image sensor uses multiple SPADs arranged in an array as a pixel array to detect light signals, different breakdown voltages are formed on different SPADs of a SPAD array to have different avalanche probability and dark count rates (i.e., count values due to noises) because different SPADs receive different effects from the manufacturing process and temperature. For this reason, the output count value of the SPAD array is still non-uniform even under uniform illumination environment, and error control can be induced in actual operation.

A well-known method for improving the uniformity is to create a better manufacturing process to lower the variation between different SPAD pixels within a specific range. However, it is difficult to cause the avalanche probability of different SPADs to be identical only using manufacturing process control. Accordingly, the imaging system in the present day still has the problem of maintaining good output uniformity.

SUMMARY

The present disclosure provides a detection device and a detection method thereof that eliminate the output non-uniformity of a SPAD array not based on the manufacturing process improvement.

The present disclosure provides a detection device including a sensor array, multiple counters and a processor. The sensor array includes a plurality of SPADs arranged in an array, and the plurality of SPADs is respectively configured to trigger an avalanche current while receiving a photon. Each of the multiple counters is configured to count a number of triggering times of the avalanche current of a corresponding SPAD within an exposure interval. The processor is configured to use a stored calibration matrix, which comprises a plurality of gain calibration values corresponding to every SPAD of the sensor array, to calibrate a counting image frame outputted by the sensor array. Each of the gain calibration values of the calibration matrix is associated with a count difference and a time difference. The count difference is a difference between two numbers of triggering times of the avalanche current of one SPAD corresponding to two different exposure intervals. The time difference is a difference between the two different exposure intervals.

The present disclosure further provides a detection method of a detection device. The detection device includes a sensor array, multiple counters and a processor. The detection method includes the steps of: counting, by the multiple counters, a number of triggering times of an avalanche current of every single photon avalanche diode (SPAD) column of the sensor array to generate a counting image frame; and dividing, by the processor, each count value of the number of triggering times of the counting image frame by a gain calibration value of a corresponding position in a stored calibration matrix, which comprises a plurality of gain calibration values corresponding to every SPAD of the sensor array, to generate a calibrated image frame, wherein each of the gain calibration values of the calibration matrix is associated with a count difference and a time difference, the count difference is a difference between two numbers of triggering times of the avalanche current of one SPAD corresponding to two different exposure intervals, and the time difference is a difference between the two different exposure intervals.

The present disclosure further provides a generating method of a calibration matrix for a SPAD array. The generating method includes the steps of: illuminating, by a light source, the SPAD array for a first exposure interval using light intensity; counting a number of triggering times of an avalanche current of a plurality of SPADs of the SPAD array within the first exposure interval to generate a first count matrix; illuminating, by the light source, the SPAD array for a second exposure interval using the same light intensity; counting a number of triggering times of an avalanche current of the plurality of SPADs of the SPAD array within the second exposure interval to generate a second count matrix; and calculating a count difference matrix between the second and first count matrices, and a time difference between the second and first exposure intervals for generating the calibration matrix.

The present disclosure further provides a generating method of a calibration output for a SPAD array. The generating method includes the steps of: exposing the SPAD array for a first exposure interval at an illuminating intensity to generate a first output data; exposing the SPAD array for a second exposure interval at the same illuminating intensity to generate a second output data; and calculating an output difference between the second and first output data, and a time difference between the second and first exposure intervals for generating the calibration output.

BRIEF DESCRIPTION OF THE DRAWINGS

Other objects, advantages, and novel features of the present disclosure will become more apparent from the following detailed description when taken in conjunction with the accompanying drawings.

FIG. 15A is a schematic diagram of output count values of a SPAD array before calibration.

FIG. 15B is a schematic diagram of output count values of a SPAD array after calibration.

DETAILED DESCRIPTION OF THE EMBODIMENT

It should be noted that, wherever possible, the same reference numbers will be used throughout the drawings to refer to the same or like parts.

Figure 1:
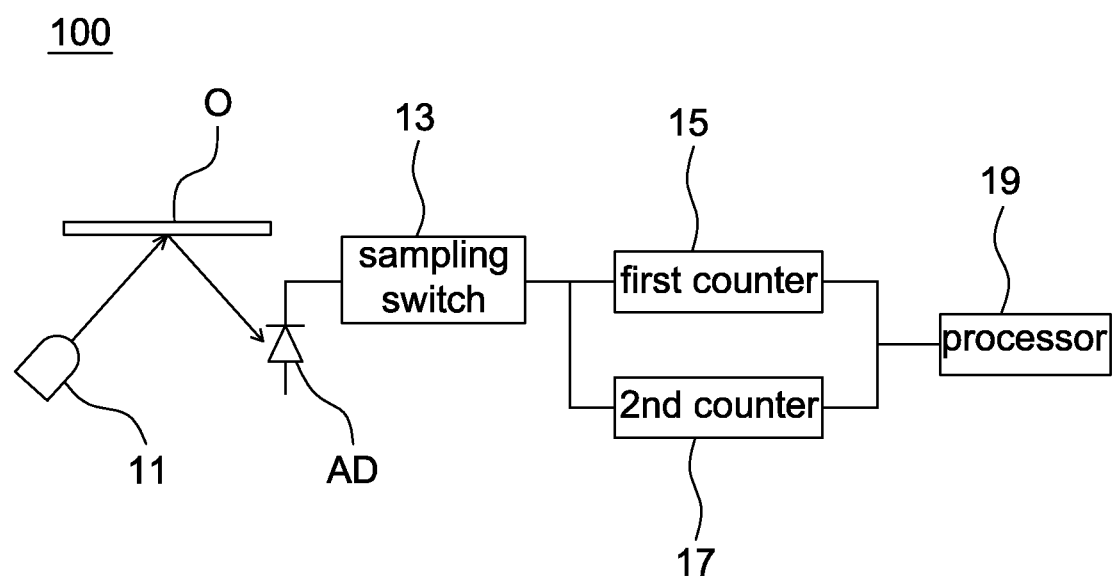
FIG. 1 is a schematic block diagram of an object detection device according to one embodiment of the present disclosure.

Referring to FIG. 1, it is a schematic block diagram of an object detection device 100 according to one embodiment of the present disclosure. The object detection device 100 is used to calculate a propagation time of light according to accumulated count values of avalanche events, which are respectively counted by two counters, within exposure intervals of a light sensor. As the velocity of light is a known value, the object detection device 100 calculates a distance of the object O from the object detection device 100 (more specifically from a light sensor thereof) according to the calculated propagation time.

As shown in FIG. 1, the object detection device 100 includes a light source 11, a light sensor (e.g., an avalanche diode AD herein), a sampling switch 13, a first counter 15, a second counter 17 and a processor 19.

Figure 2:
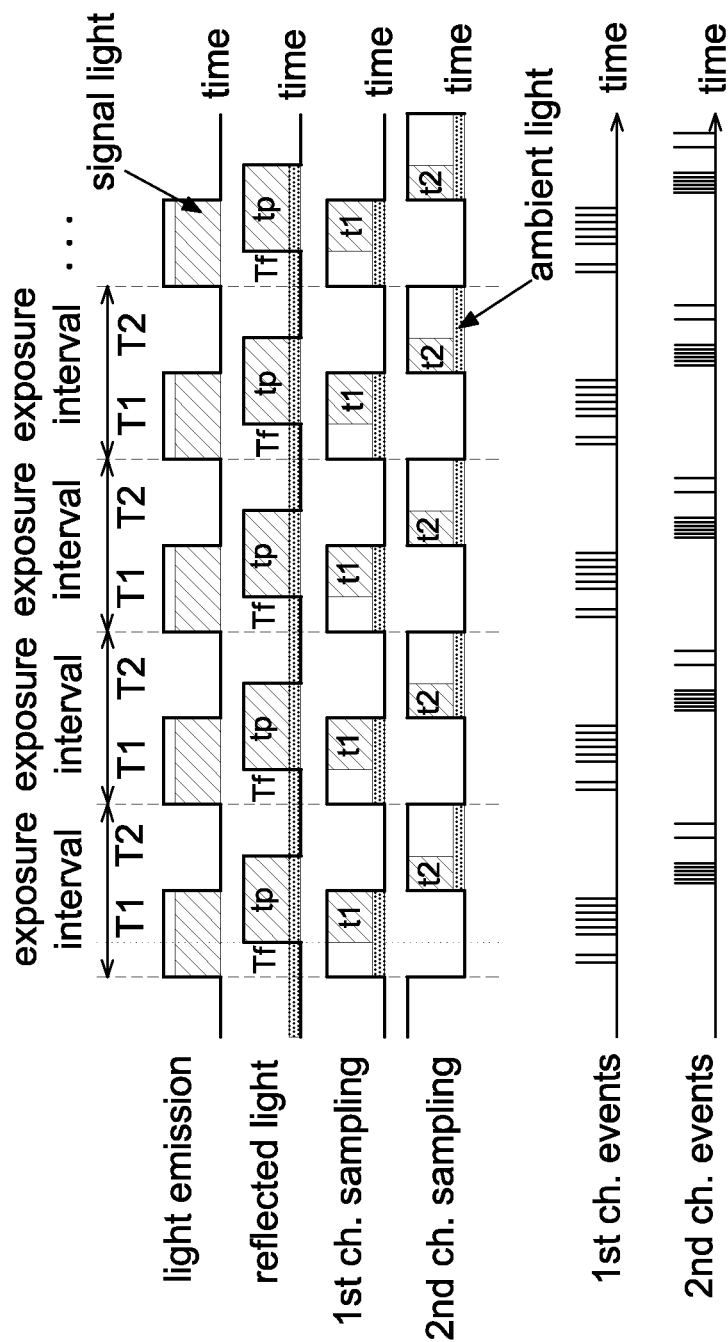
FIG. 2 is an operational schematic diagram of an object detection device according to a first embodiment of the present disclosure.

Referring to FIG. 2, one example of the object detection device 100 according to a first embodiment of the present disclosure is illustrated hereinafter.

The light source 11 is a laser diode (LD), e.g., VCSEL. The light source 11 emits light toward an object O with an identifiable spectrum (e.g., red light and/or infrared light), wherein the object O is any object within a detectable distance of the object detection device 100 without particular limitations as long as the object O reflects the light emitted by the light source 11. For example, FIG. 2 shows that the light source 11 is turned on to emit light within a first interval T1 and turned off within a second interval T2, and the light source 11 operates repeatedly in this way. For example, one exposure interval=T1+T2.

FIG. 2 shows that after the light source 11 is turned on to emit light, the emitted light reaches the avalanche diode AD after being reflected by the object O by a time interval Tf. The avalanche diode AD is, for example, a single photon avalanche diode (SPAD). It is appreciated that each time the SPAD receives or detects one photon, one avalanche current (or referred to an avalanche event) is triggered to generate an electrical pulse, e.g., a current pulse. The object detection device 100 of the present disclosure uses a number of occurrence times of this avalanche events within a predetermined time (e.g., the first interval T1 and the second interval T2) to calculate a time-of-flight (TOF), and further to calculate a distance of the object O accordingly. It is appreciated that a length of Tf is determined according to the object distance, and thus lengths of t1 and t2 are also influenced.

The sampling switch 13 is a switching device or a multiplexer, and used to conduct the avalanche diode AD with the first counter 15 in the first interval T1 to cause the first counter 15 to sample the avalanche diode AD (e.g., referred to a first channel herein). The sampling switch 13 is further used to conduct the avalanche diode AD with the second counter 17 in the second interval T2 to cause the second counter 17 to sample the avalanche diode AD (e.g., referred to a second channel herein).

The sampling herein is referred to count the avalanche events, e.g., in an interval t1, the avalanche diode AS receives light energy of both the light source signal and ambient light, and thus the first counter 15 counts a higher count value, which includes avalanche current pulses triggered by both the light source signal and ambient light. Whereas, in an interval Tf, the avalanche diode AS receives light energy of only ambient light, and thus the first counter 15 counts a lower count value, which includes avalanche current pulses triggered by only ambient light. FIG. 2 also shows events of the second channel, a period with dense events indicates both the light source signal and ambient light exists, and a period with sparse events indicates only ambient light exists.

The first counter 15 and the second counter 17 are asynchronous counters such as ripple counters.

A number of avalanche events within a predetermined time (e.g., a first interval T1) of the first channel is theoretically indicated by equation (1):

$$CN1 = t_1 \times FF \times PDP \times (P_{LD}/E_{ph}) + t_p \times FF \times PDP \times (P_{AMB}/E_{ph})$$ (1), and a number of avalanche events within a predetermined time (e.g., a second interval T2) of the second channel is theoretically indicated by equation (2):

$$CN2 = t_2 \times FF \times PDP \times (P_{LD}/E_{ph}) + t_p \times FF \times PDP \times (P_{AMB}/E_{ph}) \quad (2),$$

wherein, FF is referred to a fill factor of the avalanche diode AD, PDP is referred to a photon detection probability, $P_{LD}$ is referred to received energy of the light source signal, $P_{AMB}$ is referred to received energy of the ambient light, and $E_{ph}$ is photon energy. In the present disclosure, a time-of-flight is defined by an equation (3):

$$TOF1 = (1/2 f_{mod}) \times (CN2/(CN1+CN2)) \quad (3),$$

wherein, $f_{mod}$ is referred to a modulation frequency of the light source 11, a sampling frequency of the first channel or a sampling frequency of the second channel. Practically, CN1 and CN2 are detected by the first counter 15 and the second counter 17, respectively.

As the velocity of light is a known value, the processor 19 calculates a distance or a depth of the object O from the object detection device 100 according to TOF1 (which is associated with Tf).

It is seen from equations (1) to (3) that TOF1 is affected by ambient light due to the existence of the ambient light energy $P_{AMB}$. Meanwhile, as the PDPs of every avalanche diode AD are different from one another, in a sensor array including a plurality of avalanche diodes, the detected energy is different from pixel to pixel to cause a distance ambiguity.

To reduce the influence from ambient light, the differential operation between bright exposures and dark exposures is performed. For example referring to FIG. 3, it is an operational schematic diagram of an object detection device according to a second embodiment of the present disclosure, which is also adaptable to the object detection device 100 in FIG. 1.

Figure 3:
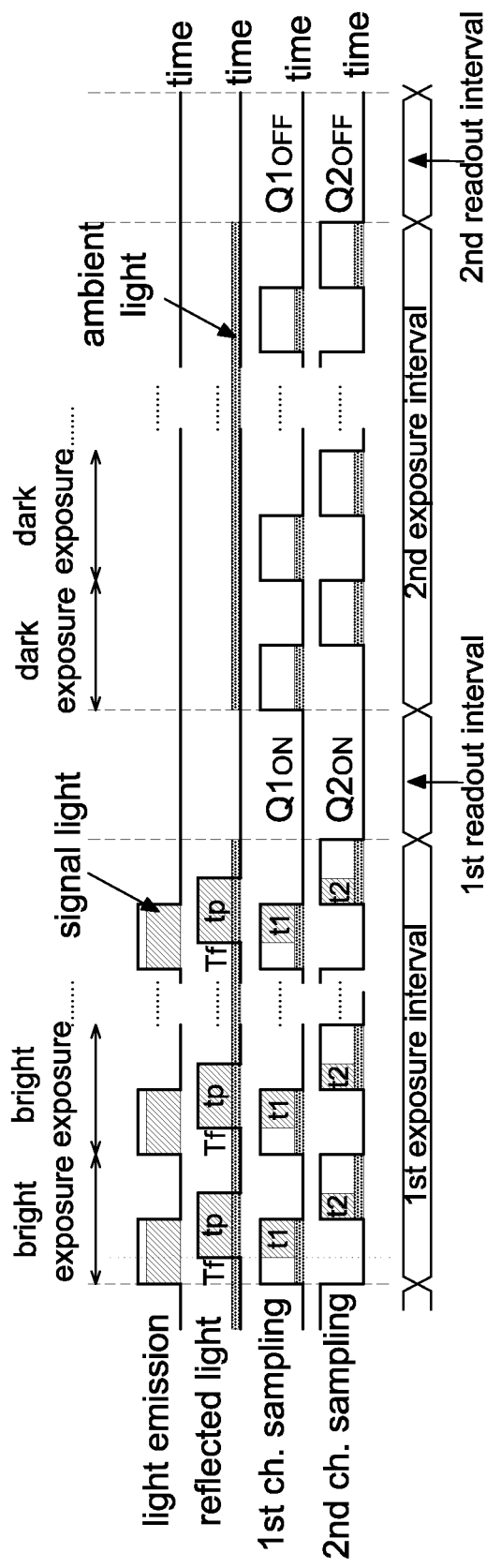
FIG. 3 is an operational schematic diagram of an object detection device according to a second embodiment of the present disclosure.

In the embodiment of FIG. 3, a first exposure interval includes a plurality of bright exposures, and the operation of each bright interval is identical to that of one exposure interval (T1+T2) in FIG. 2, and thus FIG. 3 omits the timing diagram of events. Accordingly, in the first exposure interval, the first counter 15 accumulates a first count value $Q1_{ON}$ which is N times of avalanche events of the first channel in one exposure interval of FIG. 2, e.g., $Q1_{ON}=N \times CN1$ (referring to equation 1). Similarly, the second counter 17 accumulates a second count value $Q2_{ON}$ which is N times of avalanche events of the second channel in one exposure interval of FIG. 2, e.g., $Q2_{ON}=N \times CN2$ (referring to equation 2). The processor 19 reads the first count value $Q1_{ON}$ and the second count value $Q2_{ON}$ in the first readout interval to be store in a memory (not shown) of the object detection device 100.

Next, in a second exposure interval, instead of the light source 11 being turned off, operations of the sampling switch 13, the first counter 15 and the second counter 17 are identical to those in the first exposure interval. As the light source 11 is not turned on in the second exposure interval, each exposure herein is referred to a dark exposure. Similarly, after N times of dark exposures, the first counter 15 accumulates a third count value $Q1_{OFF}$, which is N times of avalanche events of the first channel in one dark exposure interval, and the second counter 17 accumulates a fourth count value $Q2_{OFF}$, which is N times of avalanche events of the second channel in one dark exposure interval.

In this embodiment, a value of N is previously determined according to expected values of the first count value $Q1_{ON}$, the second count value $Q2_{ON}$, the third count value $Q1_{OFF}$ and the fourth count value $Q2_{OFF}$ as well as a detectable distance of the object detection device 100. The third count value $Q1_{OFF}$ is used to eliminate the influence of ambient light from the first count value $Q1_{ON}$. The fourth count value $Q2_{OFF}$ is used to eliminate the influence of ambient light from the second count value $Q2_{ON}$.

Similarly, according to equation (3), a time-of-flight of the second embodiment is defined as equation (4):

$$TOF2 = (1/2 f_{mod}) \times (Q2_{ON} - Q2_{OFF})/((Q1_{ON} - Q1_{OFF}) + (Q2_{ON} - Q2_{OFF})) \quad (4)$$

Similarly, the processor 19 calculates a distance or a depth of the object O from the object detection device 100 according to TOF2.

In FIG. 3, although noises caused by the ambient light is eliminated by the differential operation between bright exposures and dark exposures (referring to equation 4), the first exposure interval passes N times of bright exposures and the second exposure interval passes N times of dark exposures, the denoising effect is degraded when the intensity of ambient light changes with time.

Figure 4:
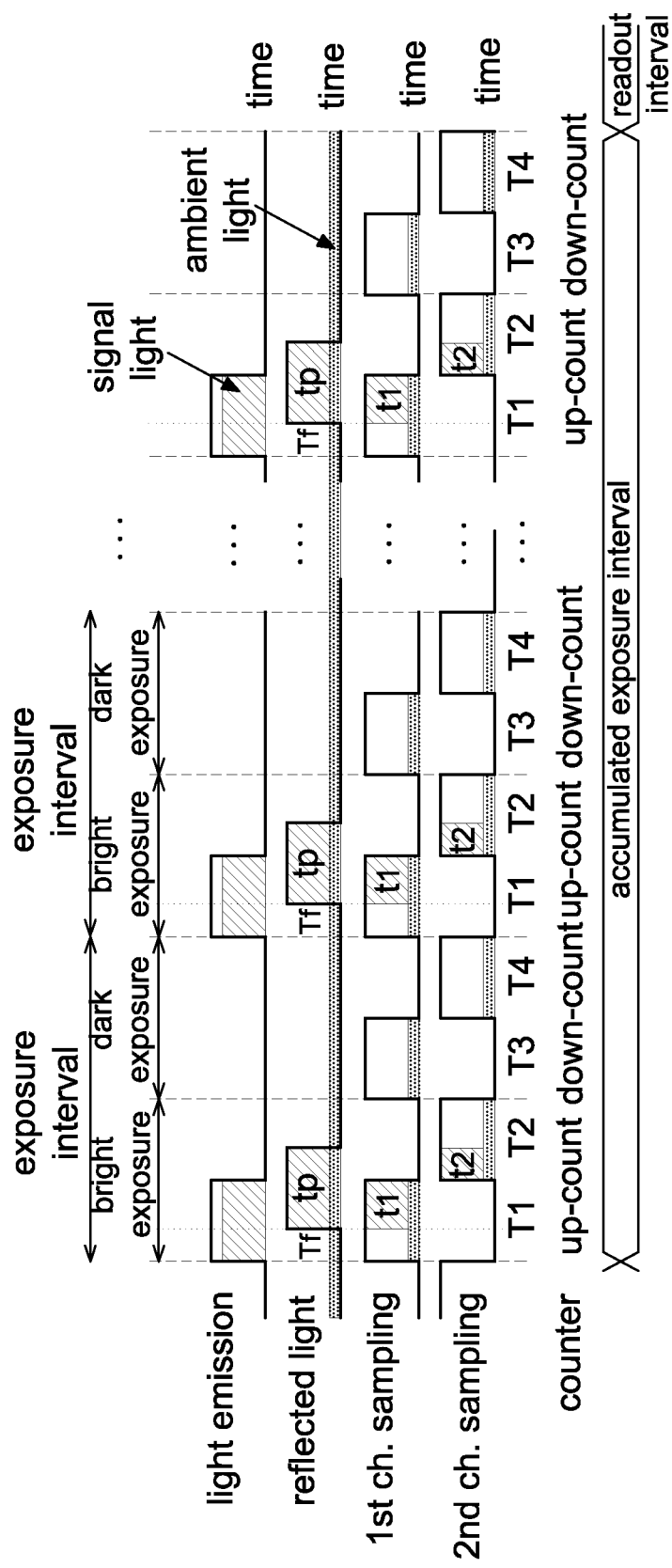
FIG. 4 is an operational schematic diagram of an object detection device according to a third embodiment of the present disclosure.

Referring to FIG. 4, it is an operational schematic diagram of an object detection device according to a third embodiment of the present disclosure, which is also implemented by the object detection device 100 of FIG. 1. The difference between FIG. 3 and FIG. 4 is that in FIG. 4, bright exposures and dark exposures are arranged adjacent to each other to further reduce the influence of time-changed ambient light.

As shown in FIG. 4, the light source 11 is turned on to emit light toward the object O within a first interval T1, and is turned off in a second interval T2, a third interval T3 and a fourth interval T4. In this embodiment, the first interval T1, the second interval T2, the third interval T3 and the fourth interval T4 form one exposure interval, e.g., one exposure interval=T1+T2+T3+T4, and T1 to T4 are preferably the same. As the first sampling channel detects the energy of light source signal in the first time interval T1, and the second sampling channel detects the energy of light source signal in the second time interval T2, the first interval T1 and the second interval T2 are referred to bright exposures herein, e.g., a bright exposure interval=T1+T2. On the other hand, as the first sampling channel does not detect the energy of light source signal in the third time interval T3, and the second sampling channel does not detect the energy of light source signal in the fourth time interval T4, the time interval T3 and the fourth time interval T4 are referred to dark exposures herein, e.g., a dark exposure interval=T3+T4.

The avalanche diode AD is exposed corresponding to the first interval T1, the second interval T2, the third interval T3 and the fourth interval T4 to receive photons and generate electrical pulses.

The sampling switch 13 conducts the avalanche diode AD to the first counter 15 within the first interval T1 and the third interval T3 to cause the first counter 15 to count the electrical pulses generated by the avalanche diode AD in the first interval T1 and in third interval T3 to generate a first count value. In this embodiment, the first counter 15 is used to perform up-counting (e.g., a count value added by 1 when one pulse being detected) on the electrical pulses in the first interval T1, and then perform down-counting (e.g., the count value decreased by 1 when one pulse being detected) on the electrical pulses in the third interval T3 to generate a first count value. In other words, the first counter 15 includes an up-counter and a down-counter or includes a counter capable of preforming both the up-counting and down-counting without particular limitations as long as a counting direction is changeable when receiving a control signal from the processor 19. In this embodiment, a final count value of the first counter 15 is not reset at the end of the first interval T1, and the final count value of the first interval T1 is decreased (i.e. down-counting) after entering the third interval T3. The down-counting in the third interval T3 is considered to remove electrical pulses triggered by ambient light from the first interval T1, and used as a method to eliminate ambient light influence.

Similarly, the sampling switch 13 conducts the avalanche diode AD to the second counter 17 within the second interval T2 and the fourth interval T4 to cause the second counter 17 to count the electrical pulses generated by the avalanche diode AD in the second interval T2 and in the fourth interval T4 to generate a second count value. In this embodiment, the second counter 17 is used to perform up-counting (e.g., a count value added by 1 when one pulse being detected) on the electrical pulses in the second interval T2, and then perform down-counting (e.g., the count value decreased by 1 when one pulse being detected) on the electrical pulses in the fourth interval T4 to generate a second count value. The second counter 17 is selected to be identical to the first counter 15. Similarly, a final count value of the second counter 17 is not reset at the end of the second interval T2, and the final count of the second interval T2 is decreased (i.e. down-counting) after entering the fourth interval T4. The down-counting in the fourth interval T4 is considered to remove electrical pulses triggered by ambient light from the second interval T2, and used as a method to eliminate ambient light influence.

The first count value obtained at the end of the third interval T3 and the second count value obtained at the end of the fourth interval T4 are the result by eliminating ambient light influence, and further differential operation or subtraction operation is no longer necessary.

The processor 19 processes the first count value and the second count value to calculate a time-of-flight or a distance between the object O and the object detection device 100. For example, the processor 19 calculates the time-of-flight according to the first count value and the second count value based on the concept of equation (3). Similarly, the first count value with a predetermined interval (e.g., one exposure interval) is indicated by equation (5) based on the concept of equation (1):

$$CN1 = (t_1 \times FF \times PDP \times P_{LD}/E_{ph} + t_p \times FF \times PDP \times P_{AMB}/E_{ph}) - (t_p \times FF \times PDP \times P_{AMB}/E_{ph}) \quad (5)$$

Similarly, based on the concept of equation (2), the second count value in a predetermined interval (e.g., one exposure interval) is indicated by equation (6):

$$CN2 = (t_2 \times FF \times PDP \times P_{LD}/E_{ph} + t_p \times FF \times PDP \times P_{AMB}/E_{ph}) - (t_p \times FF \times PDP \times P_{AMB}/E_{ph}) \quad (6)$$

The time-of-flight is calculated based on equation (3).

As mentioned above, as both equations (5) and (6) contain a probability parameter PDP, the processor 19 preferably accumulates the first count value CN1 and the second count value CN2 for a plurality of exposure intervals within an accumulated exposure interval, and a number of the plurality of exposure intervals is determined according to expected values of the first count value and the second count value as well as a detectable distance of the object detection device 100. Finally, after N times of the first count value CN1 and N times of the second count value CN2 are read in a readout interval, the time-of-flight is calculated based on equation (3).

As mentioned above, after the time-of-flight is obtained, the processor 19 further calculates a distance or a depth of the object O according to the calculated time-of-flight value.

In the above embodiment, one avalanche diode AD is taken as an example for illustration. In other embodiments, the object detection device 100 includes a sensor array having a plurality of matrix arranged avalanche diodes AD to expose corresponding to the first interval T1, the second interval T2, the third interval T3 and the fourth interval T4 to generate electrical pulses by every AD.

In this case, the object detection device 100 includes a plurality of first counters 15, each corresponding to one of the plurality of avalanche diodes AD. Each first counter 15 is used to perform up-counting on the electrical pulses generated by a corresponding avalanche diode AD thereof in the first interval T1 and then perform down-counting on the electrical pulses generated by the corresponding avalanche diode AD thereof in the third interval T3 to generate a first count value, e.g., CN1. The object detection device 100 further includes a plurality of second counters 17, each corresponding to one of the plurality of avalanche diodes AD. Each second counter 17 is used to perform up-counting on the electrical pulses generated by a corresponding avalanche diode AD thereof in the second interval T2 and then perform down-counting on the electrical pulses generated by the corresponding avalanche diode AD thereof in the fourth interval T4 to generate a second count value, e.g., CN2.

In this embodiment, the operation of each avalanche diode AD has been described above and shown in FIG. 4, and thus details thereof are not repeated herein.

The processor 19 calculates a time-of-flight of each avalanche diode AD according to the first count value CN1 and the second count value CN1 associated with the each avalanche diode AD, and thus multiple time-of-flight values are obtained.

The processor 19 further calculates a depth map (or referred to 3D image) of the object O according to the multiple time-of-flight values of the plurality of avalanche diodes AD.

In this embodiment, each avalanche diode AD is arranged corresponding to one sampling switch 13. Each sampling switch 13 is used to conduct the avalanche diode AD with a corresponding first counter 15 in the first interval T1 and the third interval T3 to cause the first counter 15 to count the electrical pulses generated by the avalanche diode AD. Each sampling switch 13 is used to conduct the avalanche diode AD with a corresponding second counter 17 in the second interval T2 and the fourth interval T4 to cause the second counter 17 to count the electrical pulses generated by the avalanche diode AD.

When ambient light has AC frequency (e.g., the frequency of power system), it is possible to form a filter-like effect using count values of the counters to reduce the influence of said AC frequency.

Figure 5:
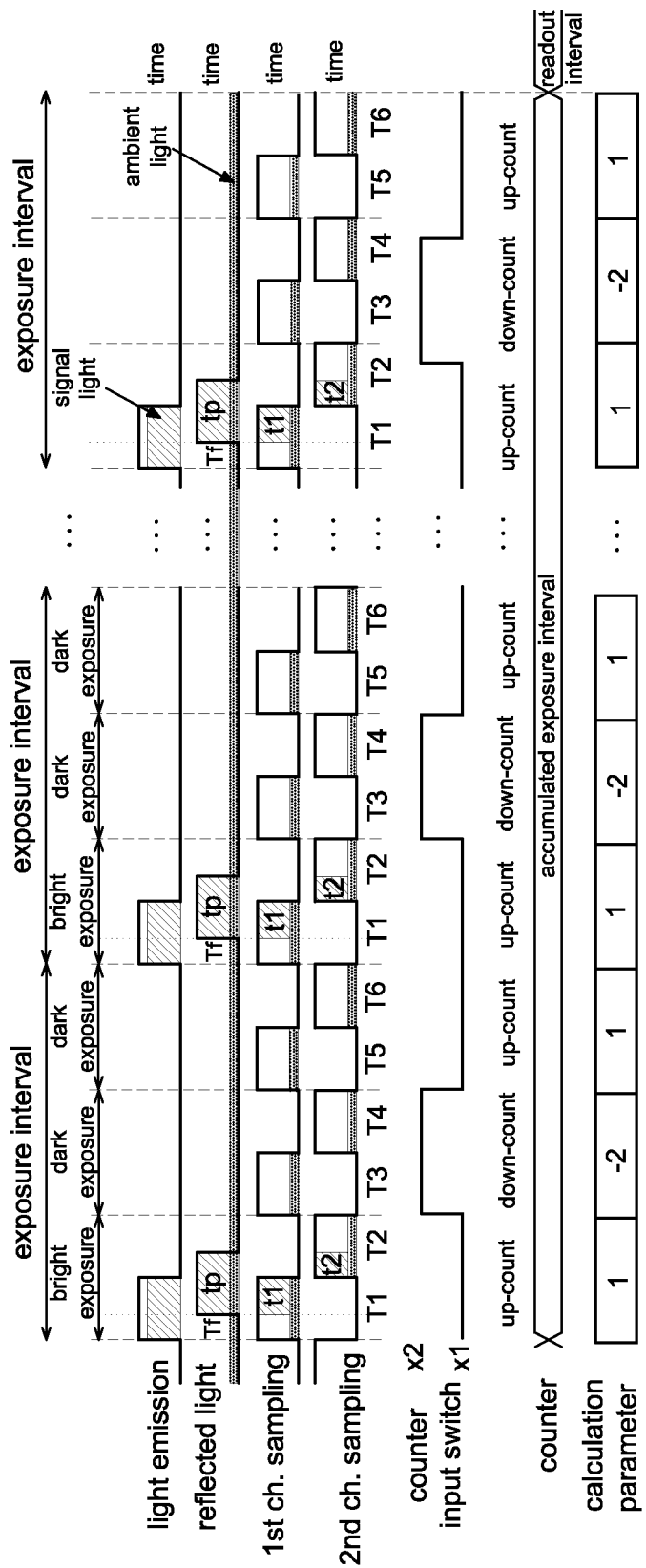
FIG. 5 is an operational schematic diagram of an object detection device according to a fourth embodiment of the present disclosure.

Referring to FIG. 5, it is an operational schematic diagram of an object detection device according to a fourth embodiment of the present disclosure, which is also implemented by the object detection device 100 in FIG. 1. As mentioned above, the object detection device 100 includes a light source 11 used to be turned on or turned off, e.g., controlled by the processor 19. The avalanche diode AD is used to perform a bright exposure to generate electrical pulses corresponding to the light source 11 being turned on, and performs a dark exposure to generate electrical pulses corresponding to the light source being turned off. In the present disclosure, an interval of the bright exposure is not referred to that the light source 11 is turned on continuously in the whole interval, but is referred to that the light source 11 is turned on at least a part of the interval thereof. An interval of the dark exposure is referred to that the light source 11 is not turned on at all therein.

Figure 7:
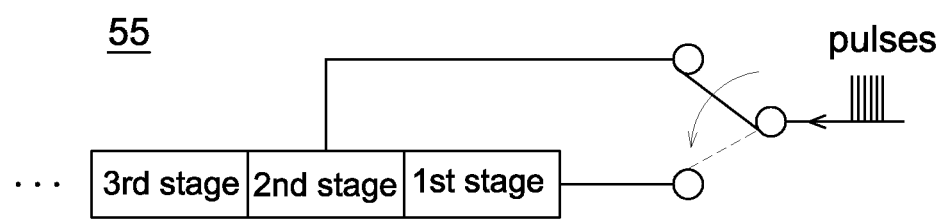
FIG. 7 is a schematic diagram of the switching control to connect a counter of an object detection device according to the fourth embodiment of the present disclosure.

As mentioned above, the first counter 15 and the second counted 17 are ripple counters. It is appreciated that a ripple counter includes multiple cascaded D flip-flops as multiple stages of counting units, as shown by element 55 in FIG. 7, wherein a number of the multiple stages is determined according to values to be counted. The electrical pulses generated by the avalanche diode AD within an interval of the bright exposure are inputted to a first stage of the multiple counting units, and the electrical pulses generated by the avalanche diode AD within an interval of the dark exposure are switched (e.g., by a switching device or a multiplexer) to be inputted to other counting units behind the first stage of the multiple counting units, i.e. bypassing the first stage counting unit. In addition, a sampling switching 13, as shown in FIG. 1, is also used to connect the avalanche diode AD to one of the first counter 15 and the second counter 17 to cause the first counter 15 or the second counter 17 to count electrical pulses generated by the avalanche diode AD.

Figure 6:
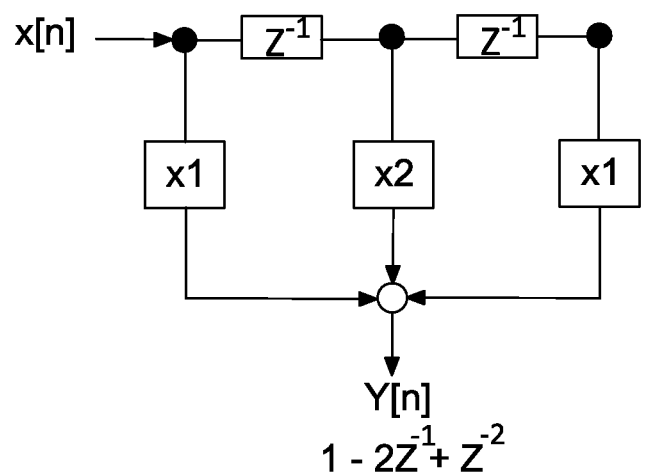
FIG. 6 is a schematic diagram of a filter transfer function of an object detection device according to the fourth embodiment of the present disclosure.

FIG. 6 is a schematic diagram of a transfer function of a two-order filter. Referring to FIG. 5 again, if it is desired to implement the transfer function shown in FIG. 6, each exposure interval contains an interval of one bright exposure (e.g., T1+T2) and intervals of two dark exposures (e.g., T3+T4 and T5+T6). It is appreciated that different transfer functions correspond to different operations, and is not limited to that shown in FIG. 5 as long as one exposure interval contains one bright exposure interval and multiple dark exposure intervals. The transfer function is determined according to an AC frequency of ambient light to be removed.

In FIG. 5, in an interval T1 of the bright exposure, the electrical pulses are inputted to a first stage counting unit of the first counter 15 to perform an up-counting on avalanche events of the first channel After the bright exposure is over, a counted value of the first counter 15 is not reset. In an interval T3 of a first dark exposure, the electrical pulses are inputted to a second stage counting unit of the first counter 15 to perform a down-counting, which counts down from a counted value at the end of the interval T1 of the bright exposure, on avalanche events of the first channel After the first dark exposure is over, a counted value of the first counter 15 is still not reset. In an interval T5 of a second dark exposure, the electrical pulses are switched back to be inputted to the first stage counting unit of the first counter 15 again to perform an up-counting, which counts up from a counted value at the end of the interval T3 of the first dark exposure, on avalanche events of the first channel.

Similarly, in an interval T2 of the bright exposure, the electrical pulses are inputted to a first stage counting unit of the second counter 17 to perform an up-counting on avalanche events of the second channel After the bright exposure is over, a counted value of the second counter 17 is not reset. In an interval T4 of a first dark exposure, the electrical pulses are inputted to a second stage counting unit of the second counter 17 to perform a down-counting, which counts down from a counted value at the end of the interval T2 of the bright exposure, on avalanche events of the second channel. After the first dark exposure is over, a counted value of the second counter 17 is still not reset. In an interval T6 of a second dark exposure, the electrical pulses are switched back to be inputted to the first stage counting unit of the second counter 17 again to perform an up-counting, which counts up from a counted value at the end of the interval T4 of the first dark exposure, on avalanche events of the second channel.

After one exposure interval, the first counter 15 generates a first count value and the second counter 17 generates a second count value. Based on the same concept of equations (3) and (4) mentioned above, the processor 19 calculates a time-of-flight Tf according to the first count value and the second count value, and further calculate a distance of the object O accordingly.

In this embodiment, which of the up-counting and down-counting is performed is determined according to a symbol of a calculation parameter of the transfer function, e.g., a positive value inducing the up-counting and a negative value inducing the down-counting, or vice versa. The stage of the multiple counting units to which the electrical pulses are inputted is determined according to a value of a calculation parameter of the transfer function, e.g., value 1 switching an input to a first stage, value 2 switching an input to a second stage, value 4 switching an input to a third stage, and so on.

Similarly, to allow the first count value and the second count value to reach expected values, the processor 19 does not reset (e.g., to zero) the first count value and the second count value at the end of each exposure interval, and continuously to accumulate the first count value the second count value of multiple exposure intervals to the end of the accumulated exposure interval. Or, the processor 19 stores the first count value and the second count value to a memory at the end of each exposure interval and reset the first count value and the second count value to zero. Then, the processor 19 accumulates a predetermined times of the first count value and the second count value to the stored value in the memory. As mentioned above, a number of the plurality of exposure intervals to be accumulated is determined according to the expected values and a detectable distance of the object detection device 100.

As mentioned above, when a plurality of SPADs is arranged as a sensor array, the counting image frame outputted by the sensor array within an exposure interval is not uniform, i.e., output count values of every SPAD still different from one another event under uniform illumination. Accordingly, the present disclosure further provides a detection device and a detection method that homogenize the counting image frame and a calibration matrix generating method thereof to improve the accuracy in different applications.

Figure 8:
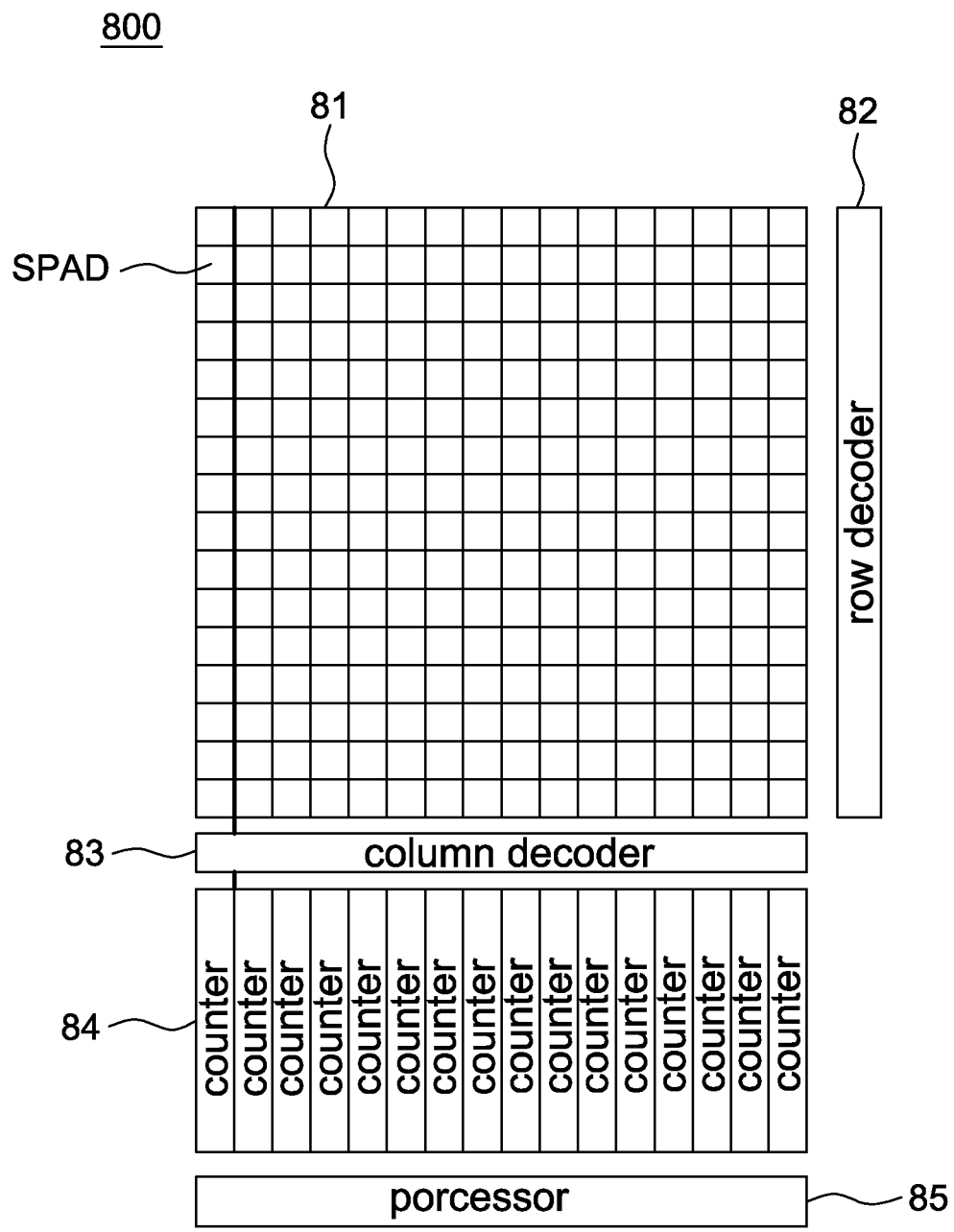
FIG. 8 is a schematic block diagram of a detection device according to one embodiment of the present disclosure.

Referring to FIG. 8, it is a schematic block diagram of a detection device 800 according to one embodiment of the present disclosure. The detection device 800 is used to count avalanche events of a plurality of SPADs by multiple counters to output a counting image frame, and perform different applications according to the counting image frame, e.g., calculating an object distance or identifying gestures, but not limited thereto. Applications using conventional CCD image sensors and CMOS image sensors are also implementable by using the detection device 800 of the present disclosure.

FIG. 8 shows that the detection device 800 includes a sensor array 81, a row decoder 82, a column decoder 83, multiple counters 84 and a processor 85. It should be mentioned that although FIG. 8 shows the multiple counters 84 being arranged corresponding to multiple pixel columns of the sensor array 81, the present disclosure is not limited thereto, wherein each pixel includes one SPAD. In other aspects, the multiple counters 84 are arranged corresponding to multiple pixel rows of the sensor array 81 without particular limitations as long as the avalanche events of every SPAD of the sensor array 81 are countable.

Figure 9:
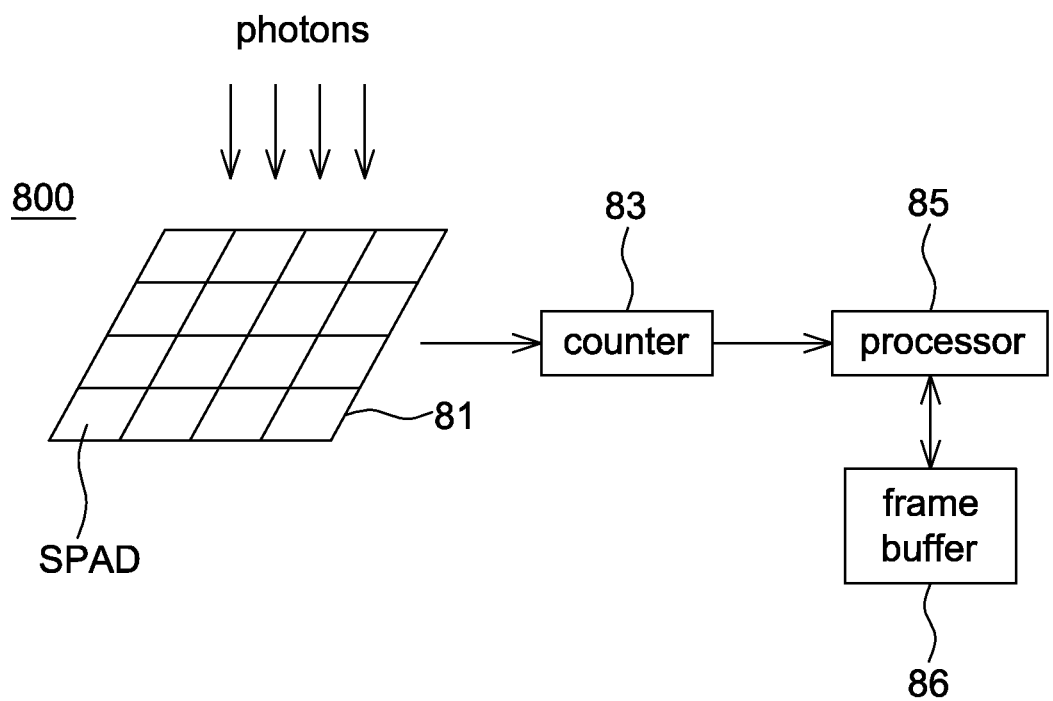
FIG. 9 is another schematic block diagram of a detection device according to one embodiment of the present disclosure.

Referring to FIG. 9 at the same time, FIG. 9 is another schematic block diagram of a detection device 800 according to one embodiment of the present disclosure. The sensor array 81 includes a plurality of SPADs arranged in an array, and each SPAD triggers an avalanche current while receiving a photon to generate an electrical pulse. The electrical pulse of one SPAD is sent to the corresponding counter 84 via a readout line. Based on control signals of the row decoder 82 and the column decoder 83, a position of the counted SPAD is selected, wherein the control of the row decoder 82 and the column decoder 83 is known to the art and not a main objective of the present disclosure and thus details thereof are not described herein. The exposure of the sensor array 81 uses the global shutter or rolling shutter according to different applications.

Each counter 84 is used to count a number of triggering times of the avalanche current (i.e. a number of electrical pulses) of a corresponding SPAD within an exposure interval. For example, each counter 84 connects one column of SPADs via at least one readout line, and is sequentially connected to every SPAD of said one column of SPADs based on the control of the row decoder 82 to count electrical pulses generated thereby. After count values of all SPADs of the sensor array 81 are obtained, the processor 85 obtains a counting image frame, which includes count values of avalanche events corresponding to every SPAD of the sensor array 81. A count value of one SPAD (or one pixel) herein is referred to electrical pulses or avalanche currents triggered within an exposure interval.

The detection device 800 of the present disclosure further includes a frame buffer 86 used to store a calibration matrix. The calibration matrix includes a plurality of gain calibration values corresponding to every SPAD of the sensor array 81. The gain calibration values are used to calibrate a counting image frame outputted by the sensor array 81 to homogenize the counting image frame. The calibration matrix is preferably generated and stored (illustrated by an example below) previously before shipment of the detection device 800.

In one non-limiting aspect, when receiving a current count value of one SPAD of the sensor array 81, the processor 85 directly reads a gain calibration value at a position in the calibration matrix corresponding to the SPAD outputting the current count value for calibration (e.g., dividing the current count value by the corresponding gain calibration value), and then outputs the calibrated value (i.e. the ratio mentioned hereinafter). When the calculation of all SPADs is accomplished, a calibrated image frame is generated. In this aspect, the processor 85 is, for example, a DSP or ASIC included in a sensor chip together with the sensor array 81. That is, the sensor chip directly outputs the calibrated values of every SPAD.

In another non-limiting aspect, the processor 85 stores the whole current counting image frame into the frame buffer 86, and then calibrates said current counting image frame by the calibration matrix (e.g., dividing the current counting image frame by the calibration matrix) to generate a calibrated image frame to be outputted. In another aspect, a different frame buffer is used to store the current counting image frame. In an alternative embodiment, the processor 85 outputs the current counting image frame without being calibrated yet to an external computer, and the external computer stores a calibration matrix and performs the calibration using the calibration matrix.

Figure 10:
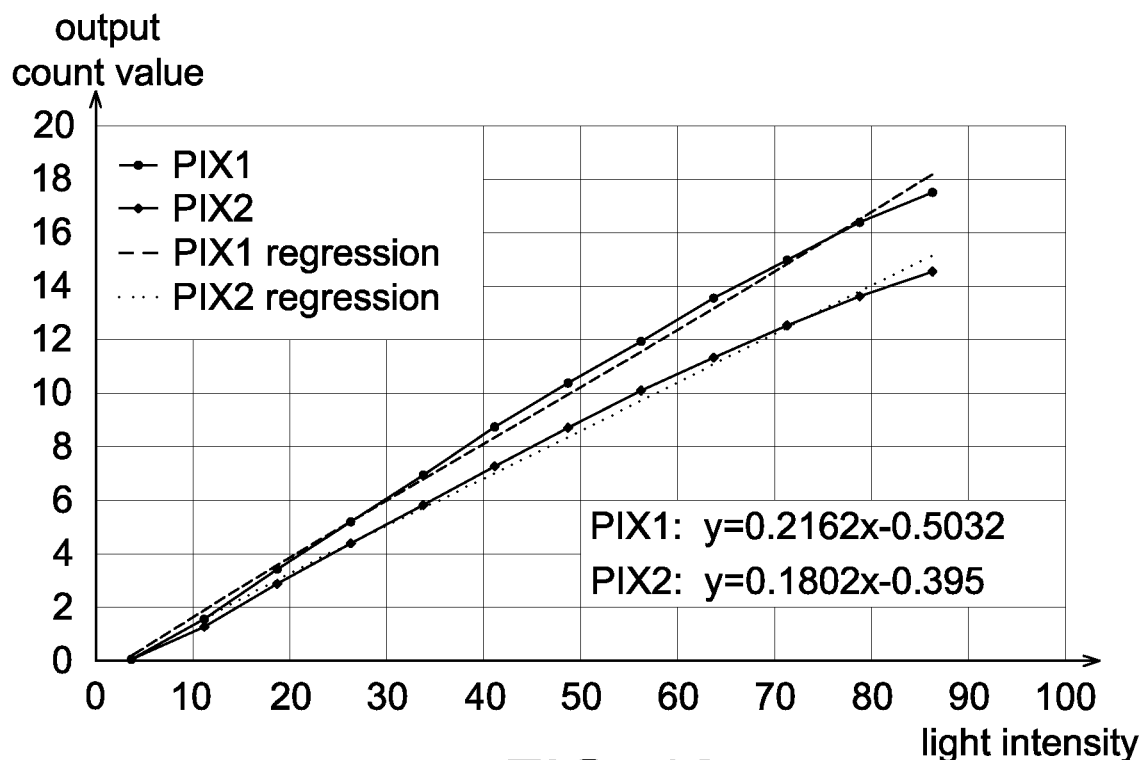
FIG. 10 is a diagram showing the relationship between output count values and light intensity of two SPADs of a SPAD array before calibration.
Figure 12:
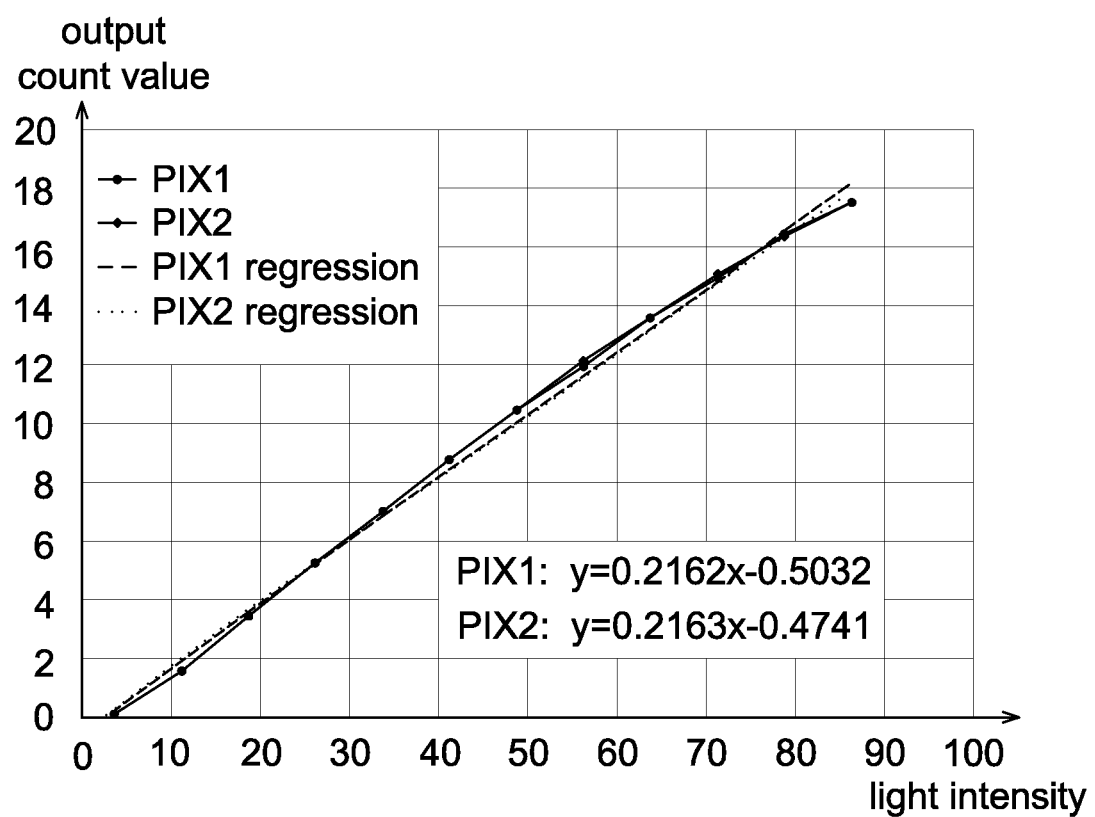
FIG. 12 is a diagram showing the relationship between output count values and light intensity of two SPADs of a SPAD array after calibration.

Referring to FIG. 10, it is a diagram showing the relationship between output count values and light intensity of two SPADs of a SPAD array before calibration. It is seen from FIG. 10 that count values of the first pixel PIX1 and the second pixel PIX2 corresponding to different light intensity have a difference therebetween, and the difference is caused by different avalanche probability and different dark count rates of different pixels. In FIGS. 10 and 12, solid lines indicate the connection line between count values at different light intensity, and dotted lines indicate the linear regression of the corresponding solid line. FIG. 10 also shows that variation slopes of the linear regression (shown by an equation) corresponding to the first pixel PIX1 and the second pixel PIX2 are 0.2162 and 0.1802, respectively.

It is appreciated that although FIG. 10 is illustrated by using only two SPADs as an example, other SPADs of the sensor array 81 respectively have different variation curves. It is able to obtain multiple variation slopes corresponding to multiple SPADs. In brief, the calibration matrix of the present disclosure is used to cause the difference (e.g., the slope varied with light intensity) between different pixels to become smaller (e.g., shown in FIG. 12) to solve the non-uniformity problem between pixels.

Figure 11:
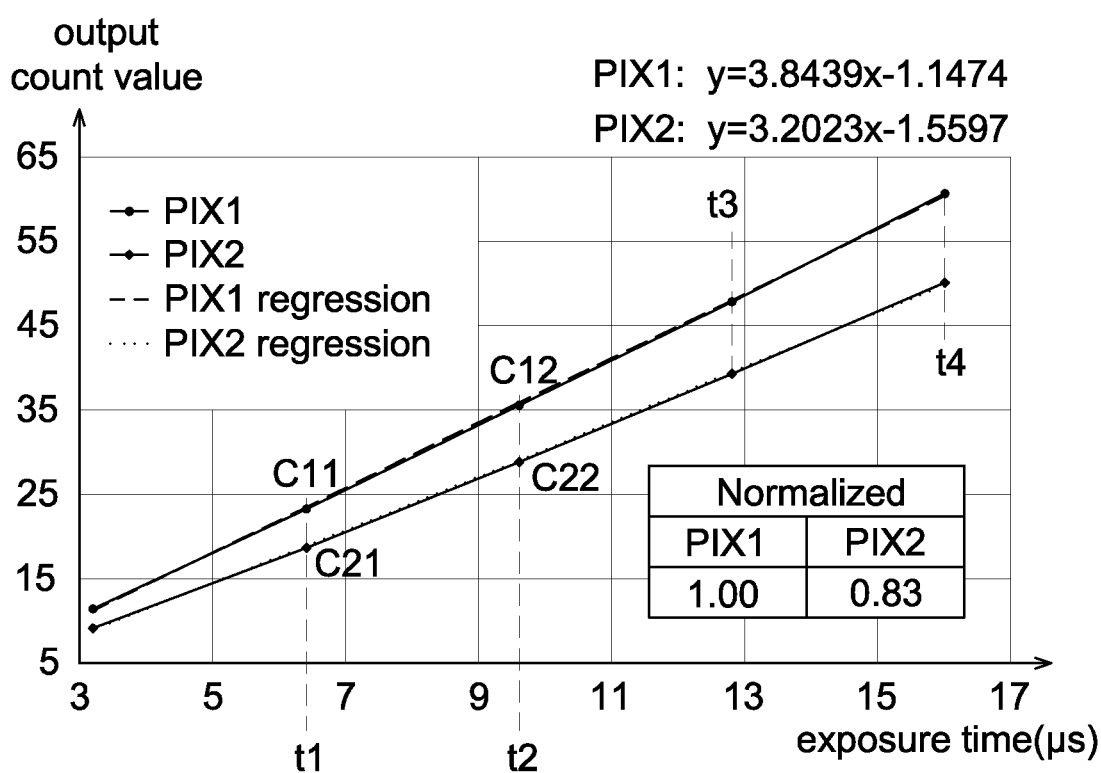
FIG. 11 is a diagram showing the relationship between output count values and exposure times of two SPADs of a SPAD array under uniform illumination.

Referring to FIG. 11, it is a diagram showing the relationship between output count values and exposure times of two SPADs (e.g., a first pixel PIX1 and a second pixel PIX2) of a SPAD array under uniform illumination. In FIG. 11, solid lines indicate the connection line between count values for different exposure times, and dotted lines indicate the linear regression of the corresponding solid line.

In one non-limiting aspect, each of the gain calibration values of the calibration matrix stored in the frame buffer 86 is associated with a variation slope of multiple different numbers of triggering times of the avalanche current of one SPAD corresponding to multiple different exposure intervals (e.g., t1 to t4). For example, FIG. 11 shows that the variation slopes (or the slope of linear regression) of the first pixel PIX1 and the second pixel PIX2 are respectively 3.8429 and 3.2023. In one aspect, the values 3.8429 and 3.2023 are stored in the frame buffer 86 as gain calibration values, corresponding to the first pixel PIX1 and the second pixel PIX2, of the calibration matrix (i.e. each pixel having a corresponding slope).

In addition, to reduce the storage space, a plurality of slopes of the plurality of SPADs of the sensor array 81 is normalized by the slope of one SPAD among the plurality of SPADs. For example, FIG. 11 further shows that the slope associated with the first pixel PIX1 is used as a reference to normalize slopes associated with all pixels, e.g., obtaining a normalized slope associated with the first pixel PIX1 equal to 1 (i.e. by calculating 3.8439/0.8439), and a normalized slope associated with the second pixel PIX2 equal to 0.83 (i.e. by calculating 3.2023/0.8439). In this aspect, the frame buffer 86 stores the normalized slopes of all SPADs as the gain calibration values of the calibration matrix. Each slope or normalized slope is preferably stored corresponding to one pixel position known by the processor 85.

In another non-limiting aspect, each of the gain calibration values of the calibration matrix stored in the frame buffer 86 is associated with a ratio, e.g., $R1=(C12-C11)/(t241)$ and $R2=(C22-C21)/(t2-t1)$ between a count difference (e.g., C12−C11 and C22−C21) and a time difference (e.g., t2−t1), wherein the count difference is a difference between two numbers of triggering times (e.g., count values C11, C12, C21, C22 in FIG. 11) of the avalanche current of one SPAD corresponding two different exposure intervals, and the time difference is a difference between said two different exposure intervals (e.g., t1, t2 in FIG. 11).

In one aspect, each of the gain calibration values of the calibration matrix stored in the frame buffer 86 is the ratios (e.g., R1 and R2) corresponding to every pixel. In another aspect, a plurality of ratios of the plurality of SPADs of the sensor array 81 is normalized by the ratio of one SPAD among the plurality of SPADs (e.g., calculating R1/R1 and R2/R1 by using R1 as a reference) to reduce the storage space. In this embodiment, within the two different exposure intervals t1 and t2, the plurality of SPADs of the sensor array 81 is not illuminated by light or illuminated by identical light intensity.

In other words, in generating the calibration matrix, a light source is used to uniformly illuminate all SPADs of the sensor array 81 for at least two different exposure intervals t1 and t2, and the counters 84 are used to count a number of triggering times of every pixel (e.g., C11, C12, C21 and C22 in FIG. 11). The calibration matrix is generated according to the normalized or non-normalized counting result.

Meanwhile, the present disclosure further provides a generating method of a calibration matrix for a SPAD array to be stored in the frame buffer 86 and used in the operation of the detection device 800 shown in FIGS. 8-9. The generating method includes the steps of: illuminating, by a light source, a SPAD array for a first exposure interval using light intensity (Step S131); counting a number of triggering times of an avalanche current of a plurality of SPADs of the SPAD array within the first exposure interval to generate a first count matrix (Step S132); illuminating, by the light source, the SPAD array for a second exposure interval using the same light intensity (Step S133); counting a number of triggering times of an avalanche current of the plurality of SPADs of the SPAD array within the second exposure interval to generate a second count matrix (Step S134); calculating a count difference matrix between the second and first count matrices, and a time difference between the second and first exposure intervals (Step S135); and calculating a ratio between each count difference of the count difference matrix and the time difference as a calibration matrix (Step S136). The operation of this generating method is executed by the processor 85 of the detection device 800 or an external processor of a computer connected to the detection device 800.

Steps S131 to S134: In this generating method, a uniform light source is used to illuminate the SPAD array 81 for different exposure intervals, e.g., the first exposure interval t1 and second exposure interval t2 shown in FIG. 11, to obtain the response of each of the plurality of SPADs in the SPAD array 81 within different exposure intervals to respectively generate a count matrix corresponding to each exposure interval, e.g. a first count matrix corresponding to the first exposure interval t1 and a second count matrix corresponding to the second exposure interval t2. For example, FIG. 11 shows two count values C11 and C21 of two pixels PIX1 and PIX2 within the first exposure interval t1, and two count values C12 and C22 of two pixels PIX1 and PIX2 within the second exposure interval t2. Each count value in the first count matrix and the second count matrix represents the response to incident photons of one pixel.

Step S135: Next, the processor (85 or external processor) subtracts each count value in the first count matrix from the count value at a corresponding position in the second count matrix (in the case t2>t1) to obtain a count difference matrix, wherein the calculation of the matrix subtraction is known to the art and thus details thereof are not described herein.

Step S136: Finally, the processor (85 or external processor) uses the obtained each count difference in the count difference matrix and the time difference (t2−t1) to calculate a ratio as gain calibration values. The matrix formed by all gain calibration values is used as a calibration matrix to be stored in the frame buffer 86. In one aspect, the calibration matrix stored in the frame buffer 86 is a fixed one. In another aspect, the calibration matrix stored in the frame buffer 86 is updated using fixed pattern noise constructed during operation.

Figure 13:
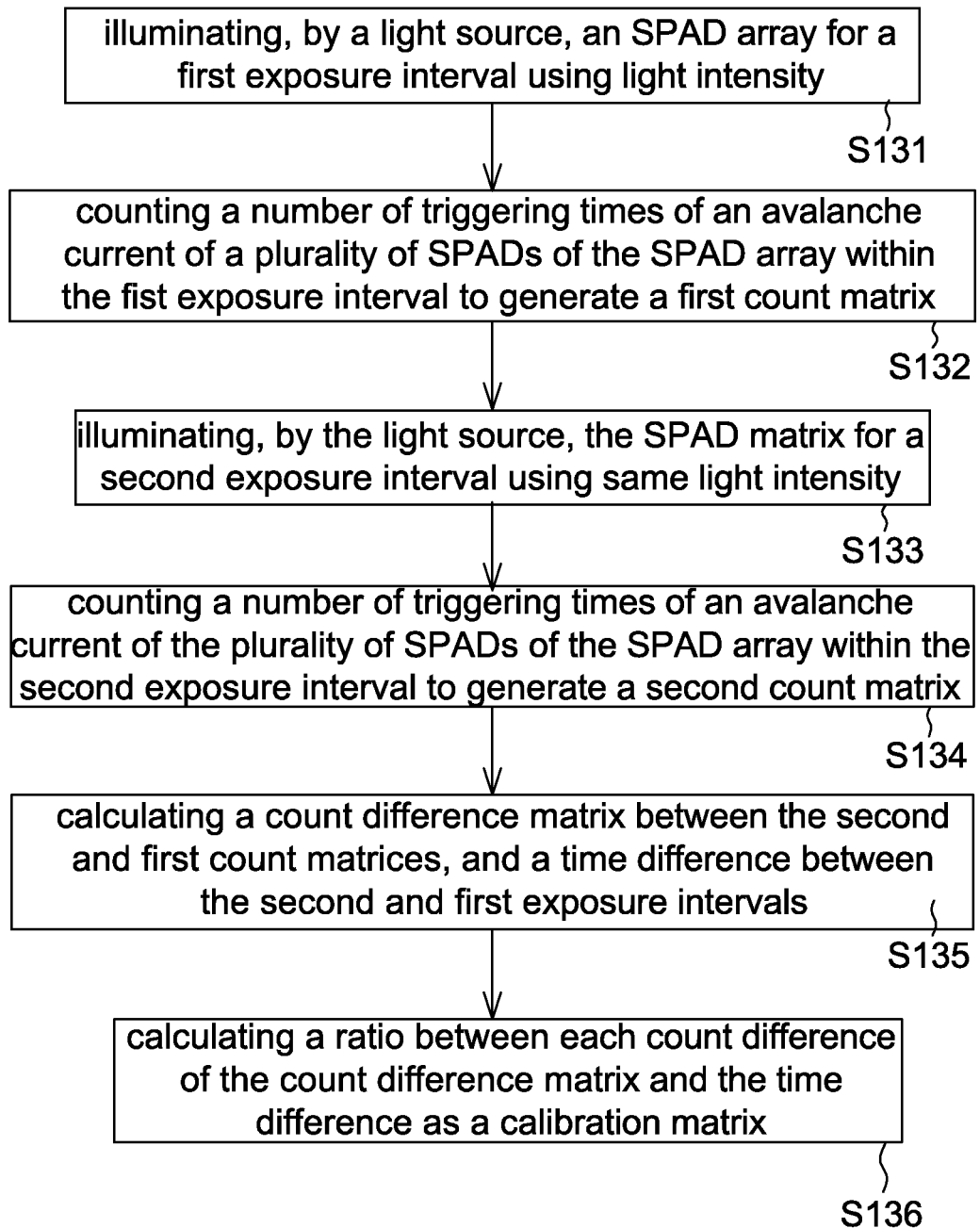
FIG. 13 is a flow chart of a calibration matrix generating method according to one embodiment of the present disclosure.

In an alternative aspect, the generating method of FIG. 13 is used to generate a calibration output for the SPAD array. The SPAD array is firstly exposed for a first exposure interval at an illuminating intensity to generate a first output data, and then exposed for a second exposure interval at the same illuminating intensity to generate a second output data. In this case, each of the first output data and the second output data has a plurality of count values, counted by the counter 83, corresponding to the plurality of SPADs. Then, the processor 85 calculates an output difference between the second and first output data, and a time difference between the second and first exposure intervals, wherein the output difference includes a plurality of count differences of output count values between the first output data and the second output data. The processor 85 further calculates a ratio between each count difference, corresponding to each SPAD of the SPAD array, of the output difference and the time difference as the calibration output.

As mentioned above, to reduce the storage space, each ratio in the calibration matrix is further normalized by one ratio of the calibration matrix (selected arbitrarily, e.g., the maximum one such that all gain calibration values are smaller than 1, but not limited thereto), and the normalized values are stored in the frame buffer 86 as the gain calibration values of the calibration matrix.

As mentioned above, in other aspects, more exposure intervals, e.g., t1 to t4 in FIG. 11, are used to obtain the parameter of multiple linear regressions (i.e., slopes) as every gain calibration value, or the slopes are normalized at first and then the normalized slopes are stored as every gain calibration value.

Figure 14:
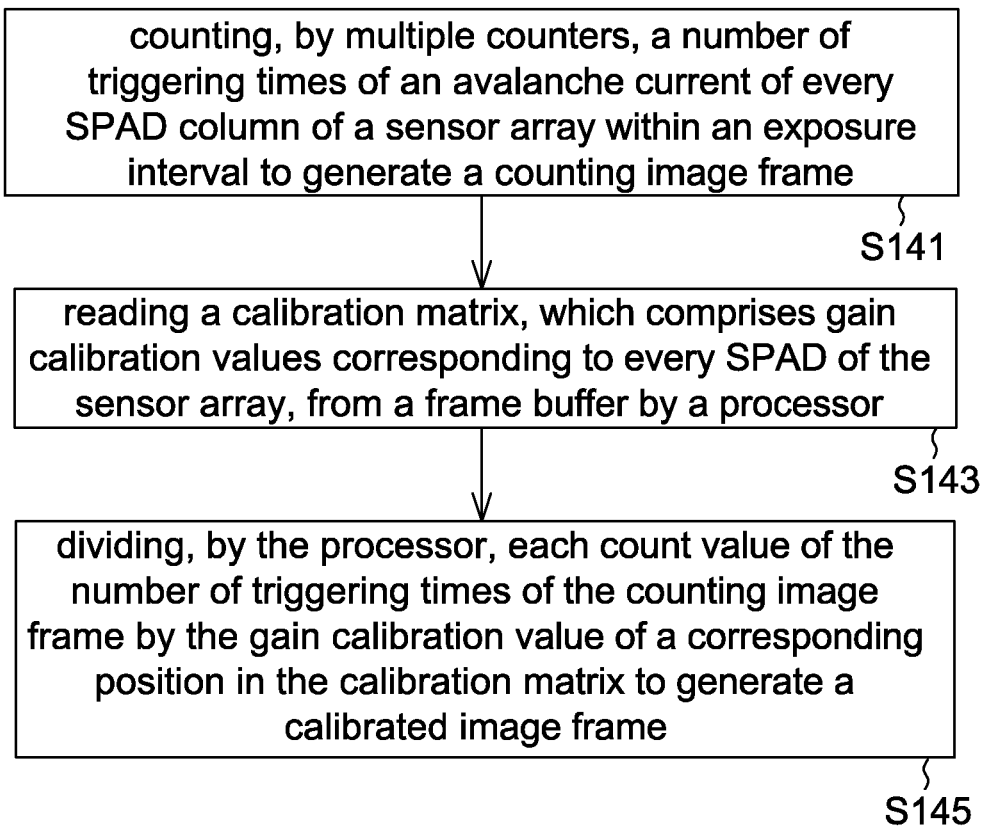
FIG. 14 is a flow chart of a detection method of a detection device according to one embodiment of the present disclosure.

Referring to FIG. 14, it is a flow chart of a detection method of a detection device according to one embodiment of the present disclosure.

The detection method of this embodiment includes the steps of: counting, by multiple counters, a number of triggering times of an avalanche current of every SPAD column of a sensor array to generate a counting image frame (Step S141); reading a calibration matrix, which comprises a plurality of gain calibration values corresponding to every SPAD of the sensor array, from a frame buffer by a processor (Step S143); and dividing, by the processor, each count value of the number of triggering times of the counting image frame by the gain calibration value of a corresponding position in the calibration matrix to generate a calibrated image frame (Step S145). This detection method is applicable to the detection device 800 shown in FIGS. 8-9.

As mentioned above, the calibration matrix is previously calculated and stored in the frame buffer 86 using an external computer or the processor 85, and the calibration matrix includes multiple slopes, normalized slopes, ratios or normalized ratios respectively corresponding to every SPAD as gain calibration values, and details thereof have been illustrated above.

In actual operation, the detection device 800 automatically determines an exposure interval to expose every SPAD according to the incident light intensity. Multiple counters 84 respectively count a number of triggering times of an avalanche current of every SPAD column of the sensor array 81 to generate a counting image frame, Step S141. As mentioned above, each counter 84 sequentially counts the avalanche events of the connected SPAD according to a row scanning signal. Before the calibration, raw data between different pixels have a variation such as a raw image frame show in FIG. 15A.

The processor 85 such as a digital signal processor (DSP) or an application specific integrated circuit (ASIC) reads or accesses the pre-stored calibration matrix from the frame buffer 86, Step S143.

Next, the processor 85 calibrates every counting image frame by the read or accessed calibration matrix to output calibrated image frames, e.g., respectively dividing every count value of the number of triggering times of the counting image frame by the gain calibration value at a corresponding position in the calibration matrix to generate the calibrated image frame as shown in FIG. 15B for example. It is seen from FIG. 15B that the calibrated image frame have a better uniformity than that of FIG. 15A.

It is appreciated that when the processor 85 directly uses the counting image frame as shown in FIG. 15A to perform the calculation, the obtained result such as the object distance can have ambiguity since a larger variation exists between every pixel as shown in FIG. 10. On the other hand, when the processor 85 uses the calibrated image frame as shown in FIG. 15B to perform the calculation, a higher accuracy is obtained since the variation between pixels is calibrated and decreased as shown in FIG. 12.

The calibration method of this embodiment is further applicable to above embodiments. That is, each time receiving a counting image frame from the sensor array 81, the processor 85 firstly calibrates the counting image frame by the calibration matrix (e.g., dividing the counting image frame by the calibration matrix) to generate a calibrated image frame, and then other calculation is performed, e.g., performing the differential operation between bright and dark exposures as well as calculating the object distance as mentioned above.

In the present disclosure, the values such as the count values, array sizes, slopes, ratios and normalized values given in the present disclosure are only intended to illustrate but not to limit the present disclosure.

As mentioned above, although the SPAD can be used to detect extremely weak light and high frequency signals, the influence of ambient light also needs to be removed to improve the detection accuracy and reduce the distance ambiguity between pixels. Accordingly, the present disclosure further provides a detection device (e.g., FIGS. 8-9) that compensates the output of a sensor array using a pre-stored calibration matrix, a detection method (e.g., FIG. 14) and a calibration matrix generating method thereof (FIG. 13) to eliminate the variation between pixels and improve detection accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A detection device, comprising:
   a sensor array, comprising a plurality of single photon avalanche photon diodes (SPADs) arranged in an array, the plurality of SPADs respectively configured to trigger an avalanche current while receiving a photon;
   multiple counters, each configured to count a number of triggering times of the avalanche current of a corresponding SPAD within an exposure interval; and
   a processor, configured to use a stored calibration matrix, which comprises a plurality of gain calibration values corresponding to every SPAD of the sensor array, to calibrate a counting image frame outputted by the sensor array,
   wherein each of the gain calibration values of the calibration matrix is associated with a count difference and a time difference,
   the count difference is a difference between two numbers of triggering times of the avalanche current of one SPAD corresponding to two different exposure intervals, and
   the time difference is a difference between the two different exposure intervals.

2. The detection device as claimed in claim 1, wherein each of the gain calibration values of the calibration matrix is further associated with a variation slope of multiple different numbers of triggering times of the avalanche current of one SPAD corresponding to multiple different exposure intervals.

3. The detection device as claimed in claim 1, wherein the plurality of SPADs is not illuminated by light within the two different exposure intervals.

4. The detection device as claimed in claim 1, wherein the plurality of SPADs is illuminated by identical light intensity within the two different exposure intervals.

5. The detection device as claimed in claim 1, wherein the calibration matrix is further normalized by one of the gain calibration values of the calibration matrix.

6. The detection device as claimed in claim 5, wherein the one of the gain calibration values is a maximum gain calibration value of the calibration matrix.

7. The detection device as claimed in claim 1, wherein the processor is further configured to calculate an object distance according to a calibrated image frame.

8. A detection method of a detection device, the detection device comprising a sensor array, multiple counters and a processor, and the detection method comprising:
   counting, by the multiple counters, a number of triggering times of an avalanche current of every single photon avalanche diode (SPAD) column of the sensor array to generate a counting image frame; and
   dividing, by the processor, each count value of the number of triggering times of the counting image frame by a gain calibration value of a corresponding position in a stored calibration matrix, which comprises a plurality of gain calibration values corresponding to every SPAD of the sensor array, to generate a calibrated image frame,
   wherein each of the gain calibration values of the calibration matrix is associated with a count difference and a time difference,
   the count difference is a difference between two numbers of triggering times of the avalanche current of one SPAD corresponding to two different exposure intervals, and
   the time difference is a difference between the two different exposure intervals.

9. The detection method as claimed in claim 8, wherein each of the gain calibration values of the calibration matrix is further associated with a variation slope of multiple different numbers of triggering times of the avalanche current of one SPAD corresponding to multiple different exposure intervals.

10. The detection method as claimed in claim 8, wherein the plurality of SPADs is not illuminated by light within the two different exposure intervals.

11. The detection method as claimed in claim 8, wherein the plurality of SPADs is illuminated by identical light intensity within the two different exposure intervals.

12. The detection method as claimed in claim 8, further comprising:
    normalizing the calibration matrix by one of the gain calibration values.

13. The detection method as claimed in claim 12, wherein the one of the gain calibration values is a maximum gain calibration value of the calibration matrix.

14. The detection method as claimed in claim 8, further comprising:
    calculating an object distance according to the calibrated image frame.

15. A generating method of a calibration matrix for a single photon avalanche diode (SPAD) array, the generating method comprising:
    illuminating, by a light source, the SPAD array for a first exposure interval using light intensity;
    counting a number of triggering times of an avalanche current of a plurality of SPADs of the SPAD array within the first exposure interval to generate a first count matrix;
    illuminating, by the light source, the SPAD array for a second exposure interval using the same light intensity;
    counting a number of triggering times of an avalanche current of the plurality of SPADs of the SPAD array within the second exposure interval to generate a second count matrix; and
    calculating a count difference matrix between the second and first count matrices, and a time difference between the second and first exposure intervals for generating the calibration matrix.

16. The generating method as claimed in claim 15, further comprising:
    normalizing the calibration matrix by one gain calibration value of the calibration matrix.

17. The generating method as claimed in claim 16, wherein the one gain calibration value is a maximum gain calibration value of the calibration matrix.

18. The generating method as claimed in claim 15, wherein the first exposure interval is different from the second exposure interval.

19. The generating method as claimed in claim 15, further comprising:
    storing the calibration matrix in a frame buffer.

20. A generating method of a calibration output for a single photon avalanche diode (SPAD) array, the generating method comprising:
    exposing the SPAD array for a first exposure interval at an illuminating intensity to generate a first output data;
    exposing the SPAD array for a second exposure interval at the same illuminating intensity to generate a second output data; and
    calculating an output difference between the second and first output data, and a time difference between the second and first exposure intervals for generating the calibration output.

* * * * *